(12) United States Patent
Haraguchi et al.

(10) Patent No.: US 11,223,420 B2
(45) Date of Patent: Jan. 11, 2022

(54) FREE-SPACE OPTICAL COMMUNICATION APPARATUS

(71) Applicant: Mitsubishi Electric Corporation, Tokyo (JP)

(72) Inventors: Eisuke Haraguchi, Tokyo (JP); Toshiyuki Ando, Tokyo (JP); Mana Hosokawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/033,118

(22) Filed: Sep. 25, 2020

(65) Prior Publication Data

US 2021/0013966 A1 Jan. 14, 2021

Related U.S. Application Data

(63) Continuation of application No. PCT/JP2018/017163, filed on Apr. 27, 2018.

(51) Int. Cl.
*H04B 10/112* (2013.01)
*H04B 10/297* (2013.01)
(Continued)

(52) U.S. Cl.
CPC ..... *H04B 10/1127* (2013.01); *H04B 10/2972* (2013.01); *H04B 10/548* (2013.01);
(Continued)

(58) Field of Classification Search
CPC ............ H04B 10/1127; H04B 10/2972; H04B 10/548; H04B 10/614; H04B 10/112;
(Continued)

(56) References Cited

U.S. PATENT DOCUMENTS 6,091,528 A * 7/2000 Kanda ................. H04B 10/118
398/1
6,618,177 B1 * 9/2003 Kato .................... H04B 10/118
398/129

(Continued)

FOREIGN PATENT DOCUMENTS

JP 2005-229253 A 8/2005

*Primary Examiner* — Dibson J Sanchez
(74) *Attorney, Agent, or Firm* — Birch, Stewart, Kolasch & Birch, LLP

(57) ABSTRACT

There includes: an optical splitter splitting modulated light into local oscillator light and signal light beams; a phase adjustment unit adjusting phases of signal light beams; an optical amplification unit amplifying signal light beams phase-adjusted; an optical phased array antenna outputting signal light beams amplified to space; a phase control unit synchronizing with a reference signal light beams, output from the optical phased array antenna and multiplexed with the local oscillator light; an acquisition and tracking mechanism adjusting output angles of signal light beams; an angle detection unit detecting arrival angles of received light; and a control unit setting the reference signal to first reference signals having different frequencies, supplementing the received light based on a detection result, setting the reference signal to second reference signals having equal frequencies, and tracking the received light based on the detection result.

6 Claims, 8 Drawing Sheets

(51) Int. Cl.
*H04B 10/548* (2013.01)
*H04B 10/61* (2013.01)
*G02F 1/29* (2006.01)
*G02B 27/00* (2006.01)

(52) U.S. Cl.
CPC ....... H04B 10/614 (2013.01); *G02B 27/0087* (2013.01); *G02F 1/292* (2013.01); *H04B 10/112* (2013.01)

(58) Field of Classification Search
CPC ... H04B 10/1125; H04B 10/118; H04B 10/11; G02F 1/292; G02B 27/0087
USPC .................................................. 398/118–131
See application file for complete search history.

(56) References Cited

U.S. PATENT DOCUMENTS

| | | | |
|---|---|---|---|
| 6,708,003 B1 * | 3/2004 | Wickham | H04B 10/1121 398/102 |
| 7,406,220 B1 * | 7/2008 | Christensen | G02B 6/032 385/27 |
| 10,419,113 B2 * | 9/2019 | Dawson | H01Q 3/2676 |
| 10,598,785 B2 * | 3/2020 | Khial | G01S 7/484 |
| 2001/0043380 A1 * | 11/2001 | Ohtsubo | H04B 10/1125 398/118 |
| 2001/0043626 A1 * | 11/2001 | Sakanaka | H04B 10/1127 372/8 |
| 2003/0193711 A1 | 10/2003 | Hildebrand | |
| 2009/0142073 A1 * | 6/2009 | Smith | H04B 10/50 398/192 |
| 2015/0378241 A1 * | 12/2015 | Eldada | G01S 7/4817 359/15 |
| 2017/0357142 A1 * | 12/2017 | Spector | G01S 7/4817 |
| 2018/0120422 A1 * | 5/2018 | Fujita | G02F 1/2955 |
| 2018/0123699 A1 * | 5/2018 | Fatemi | H04B 10/613 |
| 2018/0188452 A1 * | 7/2018 | Sun | G01S 7/4817 |
| 2018/0348592 A1 * | 12/2018 | Hosseini | G01S 17/02 |
| 2019/0056499 A1 * | 2/2019 | Fatemi | G02F 1/292 |
| 2019/0089460 A1 * | 3/2019 | Khachaturian | H04B 10/61 |
| 2019/0227351 A1 * | 7/2019 | Behroozpour | G01K 7/01 |

* cited by examiner

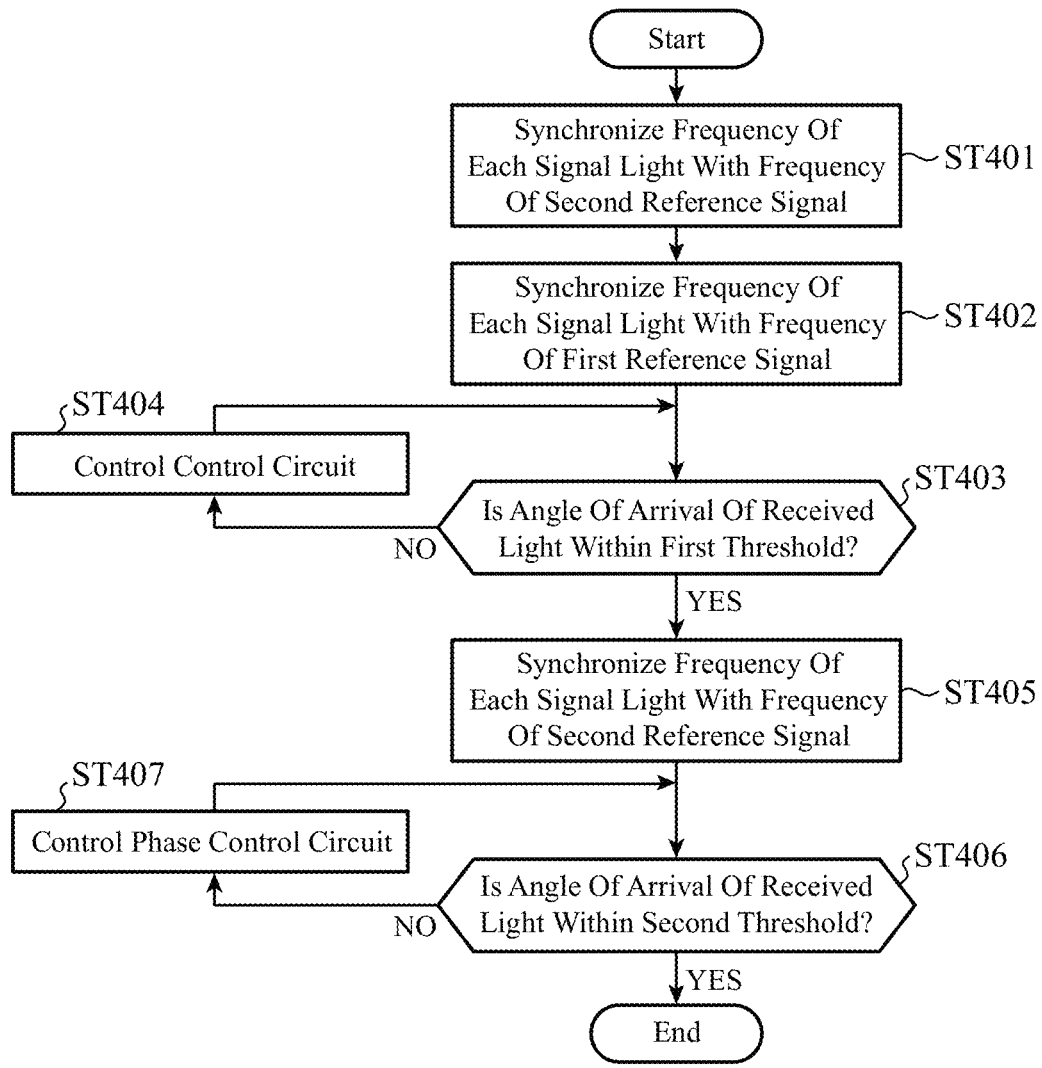
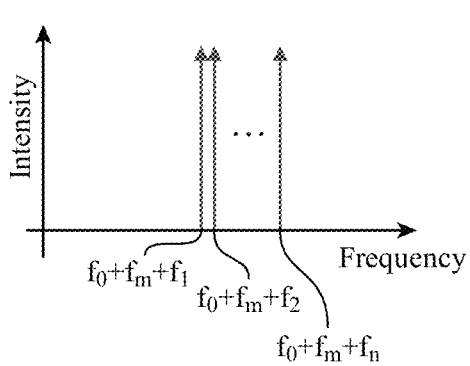
FIG. 5A
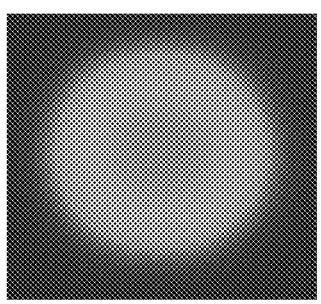
FIG. 5B
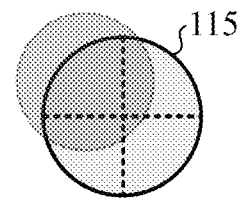
FIG. 5C

FREE-SPACE OPTICAL COMMUNICATION APPARATUS

CROSS REFERENCE TO RELATED APPLICATION

This application is a Continuation of PCT International Application No. PCT/JP2018/017163, filed on Apr. 27, 2018, which is hereby expressly incorporated by reference into the present application.

TECHNICAL FIELD

The present invention relates to a free-space optical communication apparatus that performs communication by outputting laser light to space.

BACKGROUND ART

A free-space optical communication apparatus has advantages over a typical microwave communication apparatus, which performs communication using microwaves, that the free-space optical communication apparatus is small and excellent in portability, has confidentiality due to a small beam spread, is not regulated by the Radio Law, and can use a wide frequency band to be able to perform high-speed communication.

Meanwhile, the free-space optical communication apparatus has a small beam spread and thus needs to acquire received light arriving from the party at the other end of communication and control the output angle of transmitted light, in order to establish and maintain the communication.

On the other hand, there is known a free-space optical communication apparatus that performs initial acquisition of the received light by outputting beacon light having high output and wide angle in addition to communication light (see, for example, Patent Literature 1).

CITATION LIST

Patent Literature

Patent Literature 1: Japanese Laid-Open Patent Application No. 2005-229253

SUMMARY OF INVENTION

Technical Problem

However, in a method using the beacon light, the free-space optical communication apparatus needs to have a light source and an optical antenna for outputting the beacon light in addition to a light source and an optical antenna for outputting the transmitted light. Therefore, the method using the beacon light has a problem that the free-space optical communication apparatus is increased in size and consumes more power.

The present invention has been made to solve the above problems, and an object of the present invention is to provide a free-space optical communication apparatus that can output communication light and beacon light using a single optical antenna.

Solution to Problem

A free-space optical communication apparatus according to the present invention includes: an optical splitter for splitting modulated light into local oscillator light and a plurality of beams of signal light; a phase adjustment unit for adjusting a phase of each of the plurality of beams of signal light obtained by the optical splitter; an optical amplification unit for amplifying each of the plurality of beams of signal light obtained after phase adjustment by the phase adjustment unit; an optical phased array antenna for outputting each of the plurality of beams of signal light obtained after amplification by the optical amplification unit to space; a phase control unit for synchronizing each of the plurality of beams of signal light with a reference signal by controlling the phase adjustment unit, each of the plurality of beams of signal light being output from the optical phased array antenna and multiplexed with the local oscillator light obtained from the optical splitter; an acquisition and tracking mechanism for adjusting an output angle of each of the plurality of beams of signal light output from the optical phased array antenna; an angle detection unit for detecting an angle of arrival of received light arriving from the outside the apparatus; and a control unit for setting the reference signal used in the phase control unit to a plurality of first reference signals having different frequencies for the individual beams of signal light, acquiring the received light by controlling the acquisition and tracking mechanism on the basis of a result of detection by the angle detection unit, setting the reference signal to a second reference signal having an equal frequency for each of the plurality of beams of signal light after acquisition is completed, and tracking the received light by controlling the phase adjustment unit on the basis of the result of detection by the angle detection unit.

Advantageous Effects of Invention

According to the present invention having the above configuration, the communication light and the beacon light can be output using a single optical antenna.

BRIEF DESCRIPTION OF DRAWINGS

FIG. 4 is a flowchart illustrating an example of an operation of the signal processing unit in the first embodiment of the present invention.

FIGS. 5A to 5C are diagrams illustrating an example of an operation in an ICBC mode of the free-space optical communication apparatus according to the first embodiment of the present invention, in which FIG. 5A is a diagram illustrating an example of an optical spectrum, FIG. 5B is a diagram illustrating an example of a far field pattern, and FIG. 5C is a diagram illustrating an example of a positional relationship between an angle sensor and received light.

FIGS. 6A to 6C are diagrams illustrating an example of an operation in a CBC mode of the free-space optical communication apparatus according to the first embodiment of the present invention, in which FIG. 6A is a diagram illustrating an example of an optical spectrum, FIG. 6B is a diagram illustrating an example of a far field pattern, and FIG. 6C is a diagram illustrating an example of a positional relationship between an angle sensor and received light.

FIGS. 8A and 8B are graphs each illustrating an example of a result of simulation of output light intensity in the free-space optical communication apparatus according to the second embodiment of the present invention, in which FIG. 8A is a graph illustrating a case of two beams of signal light, and FIG. 8B is a graph illustrating a case of three beams of signal light.

FIGS. 10A to 10D are diagrams illustrating an example of an operation in the ICBC mode of the free-space optical communication apparatus according to the second embodiment of the present invention, in which FIG. 10A is a diagram illustrating an example of a positional relationship between an angle sensor and received light (before control), FIG. 10B is a diagram illustrating an example of output of center of gravity calculation (before control), FIG. 10C is a diagram illustrating an example of the positional relationship between the angle sensor and the received light (after control), and FIG. 10D is a diagram illustrating an example of output of the center of gravity calculation (after control).

DESCRIPTION OF EMBODIMENTS

Hereinafter, embodiments of the present invention will be described in detail with reference to the drawings.

First Embodiment

Figure 1:
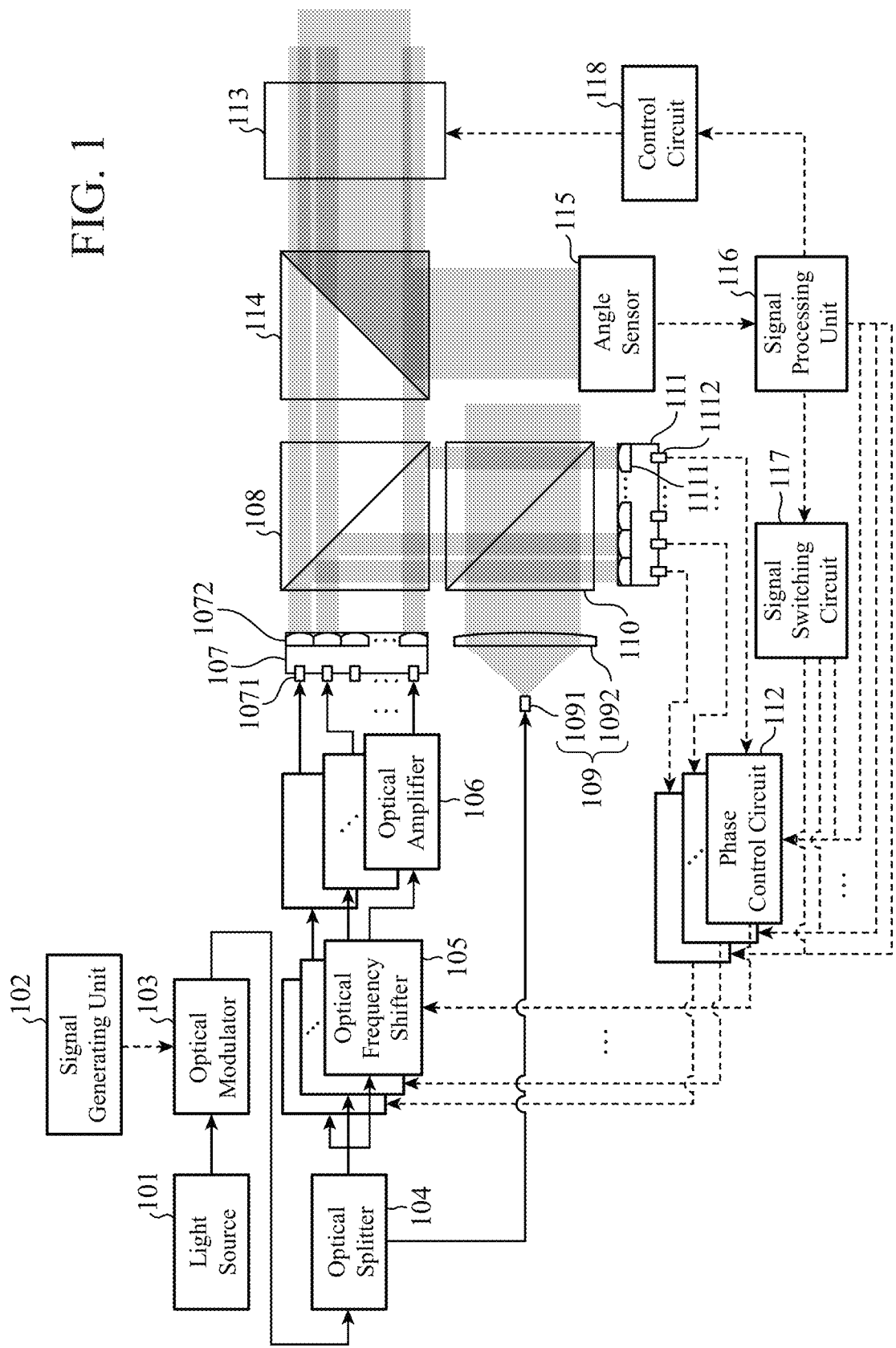
FIG. 1 is a diagram illustrating an example of a configuration of a free-space optical communication apparatus according to a first embodiment of the present invention.

FIG. 1 is a diagram illustrating an example of a configuration of a free-space optical communication apparatus according to a first embodiment of the present invention.

The free-space optical communication apparatus is a free-space optical communication apparatus of a phased array type that performs communication by outputting laser light to space. As illustrated in FIG. 1, the free-space optical communication apparatus includes a light source 101, a signal generating unit 102, an optical modulator 103, an optical splitter 104, n pieces of optical frequency shifters 105, n pieces of optical amplifiers 106, an optical phased array antenna 107, a beam splitter 108, a collimator 109, a beam splitter 110, an optical phased array antenna 111, n pieces of phase control circuits 112, an acquisition and tracking mechanism 113, a wavelength separation splitter 114, an angle sensor 115, a signal processing unit 116, a signal switching circuit 117, and a control circuit 118. The character "n" is an integer of 2 or more that is equal to the number of elements included in each of the optical phased array antennas 107 and 111.

The light source 101 emits laser light. The laser light emitted by the light source 101 is output to the optical modulator 103.

The signal generating unit 102 generates a communication signal. The communication signal generated by the signal generating unit 102 is output to the optical modulator 103.

The optical modulator 103 generates modulated light by superimposing the communication signal generated by the signal generating unit 102 on the laser light emitted by the light source 101. As the optical modulator 103, for example, a Mach-Zehnder optical modulator is used. The modulated light generated by the optical modulator 103 is output to the optical splitter 104.

The optical splitter 104 splits the modulated light generated by the optical modulator 103 into a beam of local oscillator light and n beams of signal light. As the optical splitter 104, for example, a polarization maintaining optical coupler is used. The local oscillator light obtained by the optical splitter 104 is output to the collimator 109, and the n beams of the signal light obtained by the optical splitter 104 are distributed to the n pieces of the optical frequency shifters 105 one by one.

The optical frequency shifter 105 adjusts the phase of the signal light distributed from the optical splitter 104 under the control of the phase control circuit 112. The signal light obtained after phase adjustment by the optical frequency shifter 105 is output to the optical amplifier 106 connected to the optical frequency shifter 105.

Note that the n pieces of the optical frequency shifters 105 are included in a "phase adjustment unit that adjusts the phase of each of the plurality of beams of signal light obtained by the optical splitter 104".

The optical amplifier 106 amplifies the power of the signal light that is output from the optical frequency shifter 105 connected to the optical amplifier 106. As the optical amplifier 106, for example, an optical fiber amplifier or a semiconductor optical amplifier is used. The signal light obtained after amplification by the optical amplifier 106 is output to the optical phased array antenna 107.

Note that the n pieces of the optical amplifiers 106 are included in an "optical amplification unit that amplifies each of the plurality of beams of signal light obtained after phase adjustment by the phase adjustment unit".

The optical phased array antenna 107 outputs the signal light output from each of the optical amplifiers 106 to space as collimated light. The optical phased array antenna 107 has n pieces of collimators (or elements) each including an optical fiber 1071 and a collimator lens 1072, and the n pieces of the collimators are arranged in an array. Note that one end of the optical fiber 1071 faces an output end of one of the optical amplifiers 106, and an incident surface of the collimator lens 1072 faces another end of the optical fiber 1071.

The beam splitter 108 splits each of the n beams of the signal light output from the optical phased array antenna 107 into two by transmitting a part of incident light and reflecting the rest of the incident light. Then beams of the signal light transmitted through the beam splitter 108 are used for communication in the free-space optical communication apparatus. Also, the n beams of the signal light reflected by the beam splitter 108 are used for phase error detection in the free-space optical communication apparatus.

The collimator 109 outputs the local oscillator light output from the optical splitter 104 to space as collimated light. The collimator 109 includes an optical fiber 1091 with one end facing one of a plurality of output ends of the optical splitter 104, and a collimator lens 1092 with an incident surface facing another end of the optical fiber 1091.

The beam splitter 110 multiplexes each of the n beams of the signal light with the local oscillator light by transmitting the n beams of the signal light reflected by the beam splitter 108 and reflecting the local oscillator light transmitted by the collimator 109. The n beams of the signal light multiplexed with the local oscillator light by the beam splitter 110 are output to the optical phased array antenna 111.

The optical phased array antenna 111 receives the n beams of the signal light multiplexed with the local oscillator light by the beam splitter 110. The optical phased array antenna 111 has n pieces of collimators (or elements) each including a collimator lens 1111 and a photodiode 1112, and the n pieces of the collimators are arranged in an array. Note that the collimator lens 1111 collects one beam of the signal light multiplexed with the local oscillator light by the beam splitter 110. Moreover, the photodiode 1112 is an optical receiver that receives the signal light collected by the collimator lens 1111 and converts the signal light into an electric signal. A received signal (the electric signal) being a result of reception by the optical phased array antenna 111 is output to each phase control circuit 112.

On the basis of the received signal output from the optical phased array antenna 111, the phase control circuit 112 controls an amount of phase shift of the optical frequency shifter 105 connected to the phase control circuit 112 under the control of the signal processing unit 116 and the signal switching circuit 117. At this time, the phase control circuit 112 detects a phase error between a reference signal and the received signal output from the optical phased array antenna 111, and outputs, to the optical frequency shifter 105, a phase error compensating signal for controlling the amount of phase shift so as to eliminate the phase error. Details of the phase control circuit 112 will be described later.

Note that the beam splitter 108, the collimator 109, the beam splitter 110, the optical phased array antenna 111, and then pieces of the phase control circuits 112 are included in a "phase control unit that synchronizes each of the plurality of beams of signal light with the reference signal by controlling the phase adjustment unit, each of the plurality of beams of signal light being output from the optical phased array antenna 107 and multiplexed with the local oscillator light obtained from the optical splitter 104".

Under the control of the control circuit 118, the acquisition and tracking mechanism 113 adjusts an output angle (angle of propagation) of then beams of the signal light output from the optical phased array antenna 107 and transmitted through the wavelength separation splitter 114. As the acquisition and tracking mechanism 113, for example, an adaptive mirror is used.

The wavelength separation splitter 114 is an optical path separation splitter that transmits the signal light transmitted through the beam splitter 108 and reflects received light arriving from the outside of the apparatus.

The angle sensor 115 detects an angle of arrival of the received light reflected by the wavelength separation splitter 114. As the angle sensor 115, for example, a four-quadrant angle sensor is used. A reception angle signal being a result of detection by the angle sensor 115 is output to the signal processing unit 116.

Note that the wavelength separation splitter 114 and the angle sensor 115 are included in an "angle detection unit that detects the angle of arrival of the received light arriving from the outside of the apparatus".

The signal processing unit 116 controls the phase control circuit 112, the signal switching circuit 117, and the control circuit 118 on the basis of the result of detection by the angle sensor 115. Details of the signal processing unit 116 will be described later.

Under the control of the signal processing unit 116, the signal switching circuit 117 switches the reference signal used in the phase control circuit 112 to a first reference signal or a second reference signal. The first reference signal is a reference signal for the acquisition (initial acquisition) of the received light, and has a different frequency for each signal light. In the first embodiment, each first reference signal is set to a random frequency. The second reference signal is a reference signal for communication, and has an equal frequency for each signal light.

The control circuit 118 controls the acquisition and tracking mechanism 113 under the control of the signal processing unit 116.

Note that the signal processing unit 116, the signal switching circuit 117, and the control circuit 118 are included in a "control unit that sets the reference signal used in the phase control unit to a plurality of the first reference signals having different frequencies for the individual beams of signal light, acquires the received light by controlling the acquisition and tracking mechanism 113 on the basis of the result of detection by the angle detection unit, sets the reference signal to the second reference signal having an equal frequency for each of the plurality of beams of signal light after the acquisition is completed, and tracks the received light by controlling the phase adjustment unit on the basis of the result of detection by the angle detection unit".

Next, an example of the configuration of the phase control circuit 112 will be described with reference to FIG. 2.

Figure 2:
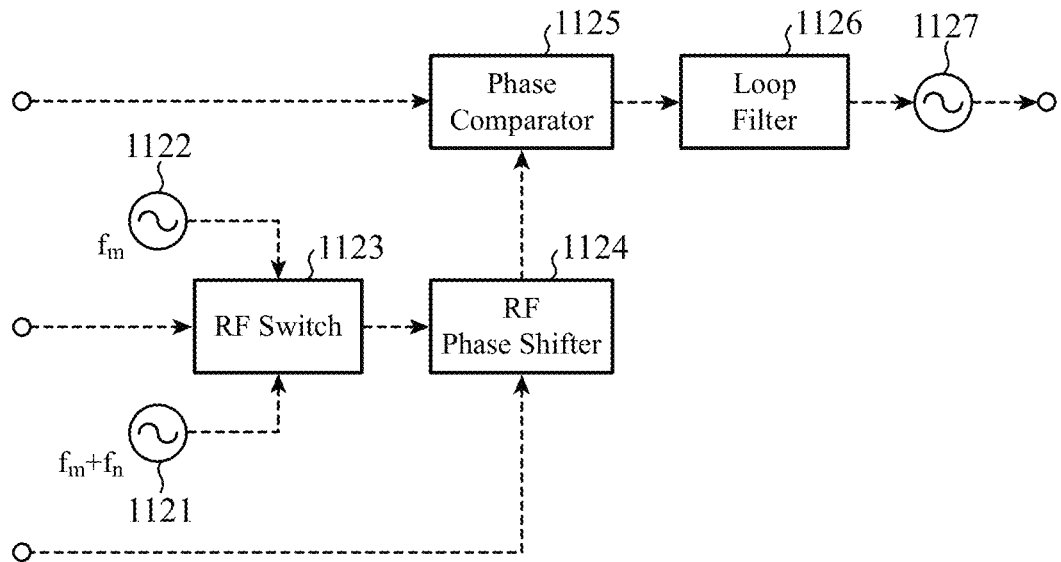
FIG. 2 is a diagram illustrating an example of a configuration of a phase control circuit in the first embodiment of the present invention.

As illustrated in FIG. 2, the phase control circuit 112 includes a signal source 1121, a signal source 1122, a radio frequency (RF) switch 1123, an RF phase shifter 1124, a phase comparator 1125, a loop filter 1126, and a voltage controlled oscillator (VCO) 1127.

The signal source 1121 generates the first reference signal. The first reference signal generated by the signal source 1121 is output to the RF switch 1123.

The signal source 1122 generates the second reference signal. The second reference signal generated by the signal source 1122 is output to the RF switch 1123.

The RF switch 1123 outputs, as the reference signal, one of the first reference signal output from the signal source 1121 and the second reference signal output from the signal source 1122 to the RF phase shifter 1124 under the control of the signal switching circuit 117.

The RF phase shifter 1124 adjusts the phase of the reference signal output from the RF switch 1123 under the control of the signal processing unit 116. The reference signal obtained after phase adjustment by the RF phase shifter 1124 is output to the phase comparator 1125.

The phase comparator 1125 detects a phase error between the reference signal output from the RF phase shifter 1124 and the received signal output from the optical phased array antenna 111. A phase comparison signal that is a result of comparison by the phase comparator 1125 is output to the loop filter 1126.

The loop filter 1126 smooths the phase comparison signal output from the phase comparator 1125. The phase comparison signal after being smoothed by the loop filter 1126 is output to the VCO 1127.

On the basis of the phase comparison signal output from the loop filter 1126, the VCO 1127 generates a high frequency signal for equalizing the frequency of the received signal output from the optical phased array antenna 111 with the frequency of the reference signal output from the RF phase shifter 1124. A phase error compensating signal, which is the high frequency signal generated by the VCO 1127, is output to the optical frequency shifter 105.

Next, an example of the configuration of the signal processing unit 116 will be described with reference to FIG. 3.

Figure 3:
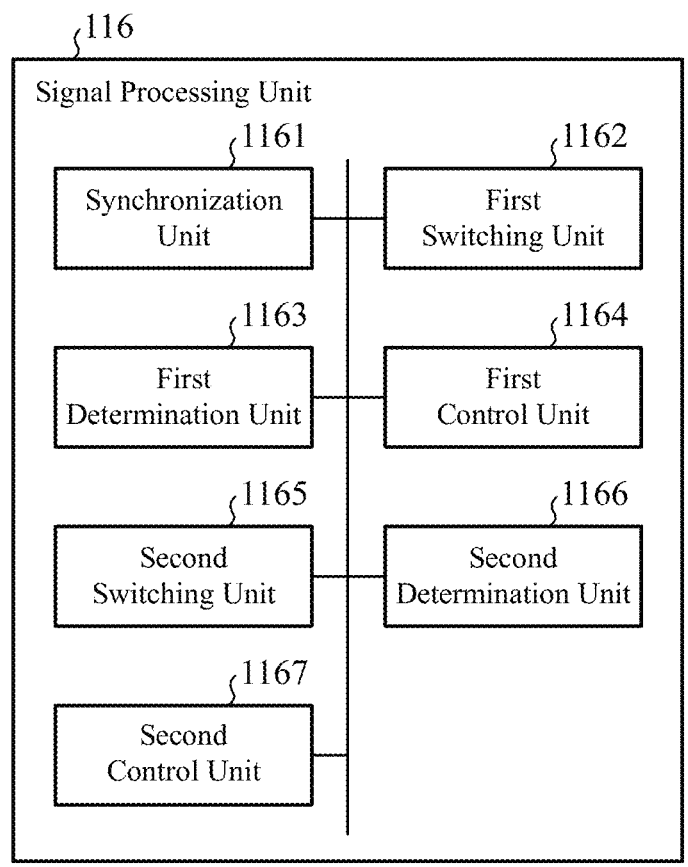
FIG. 3 is a diagram illustrating an example of a configuration of a signal processing unit in the first embodiment of the present invention.

As illustrated in FIG. 3, the signal processing unit 116 includes a synchronization unit 1161, a first switching unit 1162, a first determination unit 1163, a first control unit 1164, a second switching unit 1165, a second determination unit 1166, and a second control unit 1167.

The synchronization unit 1161 synchronizes the frequency of each signal light with the frequency of the second reference signal by controlling the signal switching circuit 117.

After the processing by the synchronization unit 1161 is completed, the first switching unit 1162 synchronizes the frequency of each signal light with the frequency of the first reference signal by controlling the signal switching circuit 117.

After the processing by the first switching unit 1162 is completed, the first determination unit 1163 determines whether a result of detection by the angle sensor 115 (the angle of arrival of the received light) is within a first threshold. The first threshold is a value within a range in which the angle sensor 115 can detect the angle of arrival of the received light.

When the first determination unit 1163 determines that the angle of arrival of the received light is not within the first threshold, the first control unit 1164 moves the angle of arrival of the received light toward the center of the angle sensor 115 by controlling the control circuit 118.

When the first determination unit 1163 determines that the angle of arrival of the received light is within the first threshold, the second switching unit 1165 synchronizes the frequency of each signal light with the frequency of the second reference signal by controlling the signal switching circuit 117.

After the processing by the second switching unit 1165 is completed, the second determination unit 1166 determines whether the result of detection by the angle sensor 115 (the angle of arrival of the received light) is within a second threshold. The second threshold is a value within a range narrower than that of the first threshold.

When the second determination unit 1166 determines that the angle of arrival of the received light is not within the second threshold, the second control unit 1167 moves the angle of arrival of the received light toward the center of the angle sensor 115 by controlling the RF phase shifter 1124 of the phase control circuit 112.

Next, an example of an overall operation of the free-space optical communication apparatus according to the first embodiment will be described with reference to FIG. 1.

In the example of the overall operation of the free-space optical communication apparatus, first, the light source 101 emits laser light, and the signal generating unit 102 generates a communication signal. Note that the laser light emitted by the light source 101 has a center frequency of $f_0$.

Next, the optical modulator 103 generates modulated light by superimposing the communication signal generated by the signal generating unit 102 on the laser light emitted by the light source 101.

Next, the optical splitter 104 splits the modulated light generated by the optical modulator 103 into a beam of local oscillator light and n beams of signal light.

Next, the phase adjustment unit (the n pieces of the optical frequency shifters 105) adjusts the phases of the n beams of the signal light obtained by the optical splitter 104.

Next, the optical amplification unit (the n pieces of the optical amplifiers 106) amplifies the n beams of the signal light obtained after phase adjustment by the phase adjustment unit.

Next, the optical phased array antenna 107 outputs then beams of the signal light obtained after amplification by the optical amplification unit to space.

Moreover, the phase control unit (the beam splitter 108, the collimator 109, the beam splitter 110, the optical phased array antenna 111, and the n pieces of the phase control circuits 112) synchronizes the n beams of the signal light with the reference signal, the n beams of the signal light having been output from the optical phased array antenna 107 and multiplexed with the local oscillator light obtained from the optical splitter 104.

Furthermore, the acquisition and tracking mechanism 113 adjusts the output angles of then beams of the signal light output from the optical phased array antenna 107.

Also, the angle detection unit (the wavelength separation splitter 114 and the angle sensor 115) detects the angle of arrival of the received light arriving from the outside of the apparatus. The signal processing unit 116 is notified of a result of the detection by the angle detection unit, thereby performing acquisition and tracking of the received light.

Next, an example of the operation of the signal processing unit 116 in the first embodiment will be described with reference to FIG. 4.

In the example of the operation of the signal processing unit 116, as illustrated in FIG. 4, the synchronization unit 1161 first synchronizes the frequencies of the n beams of the signal light with the frequency of the second reference signal by controlling the signal switching circuit 117 (step ST401). That is, the phases of the n beams of the signal light change randomly depending on the optical path, and thus the synchronization unit 1161 compensates for such phase fluctuations. At this time, under the control of the synchronization unit 1161, the signal switching circuit 117 sets the reference signal used in each phase control circuit 112 to the second reference signal. The second reference signal has an equal frequency for the n beams of the signal light, and has a center frequency of $f_m$. After that, the free-space optical communication apparatus performs the overall operation described above. The free-space optical communication apparatus thus compensates for the phase error between the beams of the signal light, and has equal frequencies and phases between the n beams of the signal light.

Next, the first switching unit 1162 synchronizes the frequency of each signal light with the frequency of the first reference signal by controlling the signal switching circuit 117 (step ST402). This operation of the first switching unit 1162 causes the free-space optical communication apparatus to enter the operation mode of an initial acquisition mode (ICBC mode). At this time, under the control of the first switching unit 1162, the signal switching circuit 117 sets the reference signal used in each phase control circuit 112 to the first reference signal. The first reference signal has a different frequency for each signal light, and has a center frequency of $(f_m+f_n)$. FIG. 5A illustrates an optical spectrum of the output light from the optical phased array antenna 107. Moreover, when the angle sensor 115 has a reception band of $f_d$, a difference between adjacent frequencies of the first reference signals is greater than or equal to the reception band of the angle sensor 115, as in the following expressions (1) and (2). In expressions (1) and (2), $\Delta f_t$ represents a difference between $f_{i+1}$ that is the frequency of an (i+1)-th first reference signal and $f_i$ that is the frequency of an i-th first reference signal.

$$f_d < \Delta f_i \quad (1)$$

$$\Delta f_i = f_{i+1} - f_i \quad (2)$$

Furthermore, in the phase control circuits 112 of the first embodiment, the differences between the adjacent frequencies of the first reference signals are set randomly so as not to be constant. As a result, the received light input to the angle sensor 115 of the free-space optical communication apparatus at the other end of communication is obtained by incoherent beam combining (ICBC) of the n beams of the signal light, and has a beam spread as in a far field pattern illustrated in FIG. 5B.

After that, the free-space optical communication apparatus performs the overall operation described above and starts the acquisition (initial acquisition) of the received light.

Next, the first determination unit 1163 determines whether a result of detection by the angle sensor 115 (the angle of arrival of the received light) is within the first threshold (step ST403). The first determination unit 1163 roughly determines the stability of transmission and reception of the signal light.

When the first determination unit 1163 determines in step ST403 that the result of detection by the angle sensor 115 is not within the first threshold, the first control unit 1164 moves the angle of arrival of the received light toward the center of the angle sensor 115 by controlling the control circuit 118 (step ST404). FIG. 5C illustrates an example of the positional relationship between the angle sensor 115 and the received light. The sequence thereafter returns to step ST403.

Figure 6A:
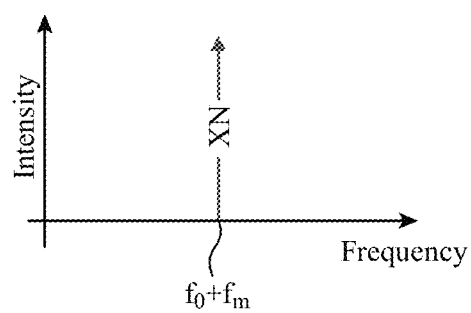
Figure 6B:
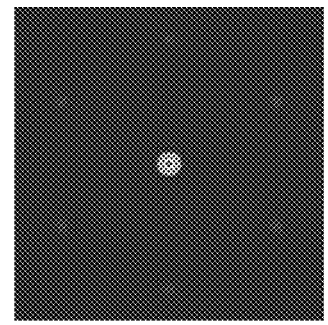

On the other hand, when the first determination unit 1163 determines in step ST403 that the result of detection by the angle sensor 115 is within the first threshold, the second switching unit 1165 synchronizes the frequency of each signal light with the frequency of the second reference signal by controlling the signal switching circuit 117 (step ST405). This operation of the second switching unit 1165 causes the free-space optical communication apparatus to enter the operation mode of a tracking mode (CBC mode). At this time, under the control of the second switching unit 1165, the signal switching circuit 117 sets the reference signal used in each phase control circuit 112 to the second reference signal. FIG. 6A illustrates an optical spectrum of the output light from the optical phased array antenna 107. Also, the received light input to the angle sensor 115 of the free-space optical communication apparatus at the other end of communication has a narrow beam size as in a far field pattern illustrated in FIG. 6B compared to the far field pattern illustrated in FIG. 5B. Therefore, the angle sensor 115 can detect the angle with high accuracy compared to the case of acquiring the received light.

Next, the second determination unit 1166 determines whether the result of detection by the angle sensor 115 (the angle of arrival of the received light) is within the second threshold (step ST406). The second determination unit 1166 determines the stability of transmission and reception of the signal light with high accuracy.

Figure 6C:
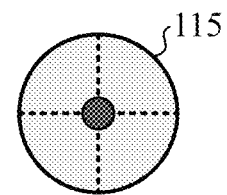

When the second determination unit 1166 determines in step ST406 that the result of detection by the angle sensor 115 is not within the second threshold, the second control unit 1167 moves the angle of arrival of the received light toward the center of the angle sensor 115 by controlling the phase control circuit 112 (step ST407). FIG. 6C illustrates an example of the positional relationship between the angle sensor 115 and the received light. The sequence thereafter returns to step ST406.

On the other hand, when the second determination unit 1166 determines in step ST406 that the result of detection by the angle sensor 115 is within the second threshold, the signal processing unit 116 determines that the tracking of the received light is completed and ends the sequence. After that, the free-space optical communication apparatus starts optical communication with the free-space optical communication apparatus at the other end of communication.

As described above, according to the first embodiment, the free-space optical communication apparatus includes: the optical splitter 104 that splits the modulated light into the local oscillator light and the plurality of beams of signal light; the phase adjustment unit that adjusts the phase of each of the plurality of beams of signal light obtained by the optical splitter 104; the optical amplification unit that amplifies each of the plurality of beams of signal light obtained after phase adjustment by the phase adjustment unit; the optical phased array antenna 107 that outputs each of the plurality of beams of signal light obtained after amplification by the optical amplification unit to space; the phase control unit that synchronizes each of the plurality of beams of signal light with the reference signal by controlling the phase adjustment unit, each of the plurality of beams of signal light being output from the optical phased array antenna 107 and multiplexed with the local oscillator light obtained from the optical splitter 104; the acquisition and tracking mechanism 113 that adjusts the output angle of each of the plurality of beams of signal light output from the optical phased array antenna 107; the angle detection unit that detects the angle of arrival of the received light arriving from the outside the apparatus; and the control unit that sets the reference signal used in the phase control unit to the plurality of first reference signals having different frequencies for the individual beams of signal light, acquires the received light by controlling the acquisition and tracking mechanism 113 on the basis of the result of detection by the angle detection unit, sets the reference signal to the second reference signal having an equal frequency for each of the plurality of beams of signal light after acquisition is completed, and tracks the received light by controlling the phase adjustment unit on the basis of the result of detection by the angle detection unit. Therefore, the free-space optical communication apparatus according to the first embodiment can output the communication light and the beacon light switchably in terms of time using a single optical antenna (the optical phased array antenna 107), thereby being able to achieve acquisition of the received light without a beacon and achieve stabilization of free-space optical communication.

Second Embodiment

The free-space optical communication apparatus according to the first embodiment has illustrated the case where the light obtained by incoherent beam combining and having a beam spread is used as the beacon light by adding the frequency shift with the random frequency difference to each signal light. On the other hand, a free-space optical communication apparatus according to a second embodiment illustrates a case where narrow light obtained by coherent beam combining is scanned at high speed by adding a frequency shift with a constant frequency difference to each signal light.

Figure 7:
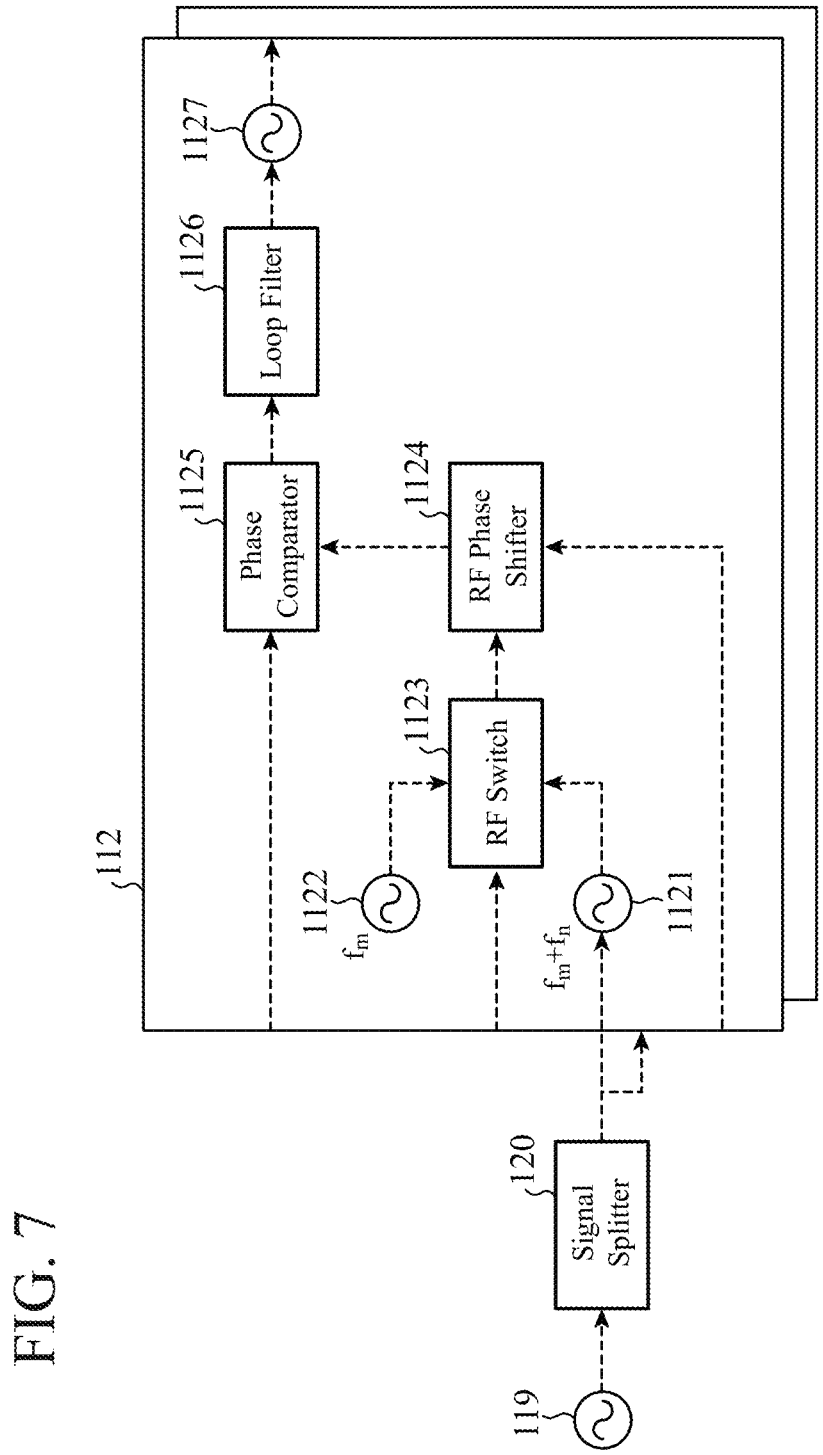
FIG. 7 is a diagram illustrating an example of a configuration of a free-space optical communication apparatus according to a second embodiment of the present invention.

FIG. 7 is a diagram illustrating an example of a configuration of the free-space optical communication apparatus according to the second embodiment of the present invention. The free-space optical communication apparatus according to the second embodiment illustrated in FIG. 7 has a signal source 119 and a signal splitter 120 added to the configuration of the free-space optical communication apparatus according to the first embodiment illustrated in FIG. 1. Note that FIG. 7 illustrates only the signal source 119, the signal splitter 120, and each phase control circuit 112 of the free-space optical communication apparatus according to the second embodiment. The other configurations of the free-space optical communication apparatus according to the second embodiment are similar to those of the free-space optical communication apparatus according to the first embodiment illustrated in FIG. 1, and thus only different parts will be described.

The signal source 119 generates a third reference signal. The third reference signal is a reference signal for synchronizing each first reference signal. The third reference signal generated by the signal source 119 is output to the signal splitter 120.

The signal splitter 120 splits the third reference signal generated by the signal source 119 into n beams. Then beams of the third reference signals obtained by the signal splitter 120 are distributed one by one to the signal sources 1121 of then pieces of the phase control circuits 112.

Note that the signal source 1121 generates the first reference signal synchronized with the third reference signal obtained from the signal splitter 120. In the second embodiment, the first reference signals have a constant difference between adjacent frequencies.

Moreover, after the processing by the first switching unit 1162 is completed, the first determination unit 1163 performs center of gravity calculation on a result of detection by the angle sensor 115 (the angle of arrival of the received light), and determines whether an average value of the center of gravity calculation is within a first threshold.

When the first determination unit 1163 determines that the average value of the center of gravity calculation is not within the first threshold, the first control unit 1164 moves the average value of the center of gravity calculation toward the center of the angle sensor 115 by controlling the control circuit 118.

Next, an example of an operation of the free-space optical communication apparatus according to the second embodiment will be described. For simplification, the following illustrates a case where a plurality of elements included in the optical phased array antenna 107 is arrayed in one dimension.

In the example of the operation of the free-space optical communication apparatus according to the second embodiment, the first reference signals have a uniform difference of $\Delta f$ between adjacent frequencies, and each of the first reference signals is synchronized with the third reference signal distributed from the signal splitter 120. When $\Delta f=10$ MHz, for example, $f_1=10$ MHz, $f_2=20$ MHz, ..., and $f_n=n\times 10$ MHz.

Figure 8:
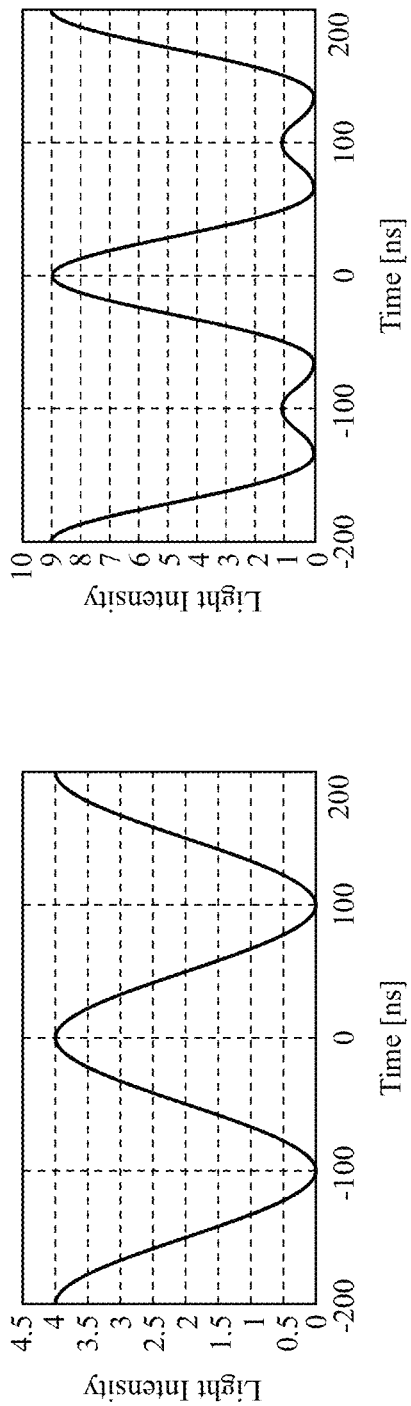

Thus, by setting the difference between the adjacent frequencies of the first reference signals to a fixed value that is synchronized, the phase difference between the beams of the signal light changes periodically depending on the difference between the frequencies. For example, as illustrated in FIG. 8A, when the free-space optical communication apparatus uses two beams of the signal light with the frequency difference therebetween being 10 MHz, the phase difference between the beams of the signal light oscillates between $\pm\pi$ at 10 MHz. This is synonymous with the free-space optical communication apparatus sweeping the phase in the range of 0 to $\pi$ at 20 MHz (=2×10 MHz). Note that FIG. 8B illustrates a case where the free-space optical communication apparatus uses three beams of the signal light with the frequency difference therebetween being 10 MHz.

Meanwhile, there has been a free-space optical communication apparatus of a phased array type that acquires received light without a beacon by electronically controlling the phase of each signal light and performing beam scanning. However, in this electronically controlled beam scanning method, the scan rate is limited by the loop bandwidth of a phase locked loop (PLL).

On the other hand, the free-space optical communication apparatus according to the second embodiment sets the frequency difference between the beams of the signal light to be constant at the time of acquiring the received light, thereby performing sweeping without electrically controlling the phase of each signal light. As a result, the free-space optical communication apparatus according to the second embodiment can perform high-speed beam scanning in the MHz band or higher without being limited to the loop bandwidth of the PLL.

Moreover, as in the following expression (3), the difference between adjacent frequencies of the first reference signals is less than or equal to the reception band of the angle sensor 115.

$$2\Delta f \leq f_d \qquad (3)$$

The value of $f_d$ is several tens of MHz to several GHz when the angle sensor 115 is a four-quadrant photodiode. On the other hand, in the electronically controlled beam scanning method, the scan rate is limited to the PLL loop bandwidth of less than 100 kHz.

Figure 9:
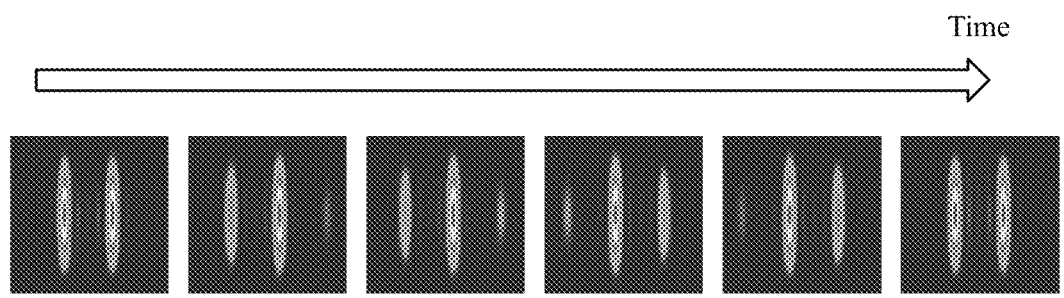
FIG. 9 is a diagram illustrating an example of an operation in the CBC mode of the free-space optical communication apparatus according to the second embodiment of the present invention, and is a diagram illustrating an example of a far field pattern.
Figure 10A:
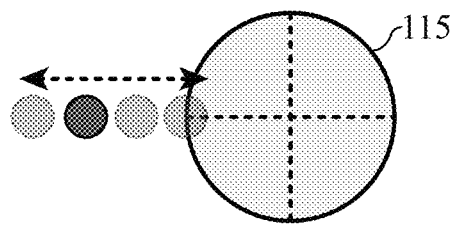
Figure 10B:
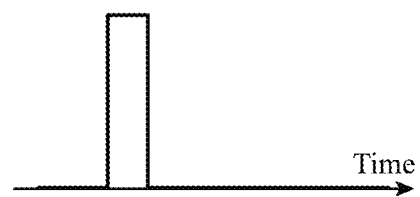
Figure 10C:
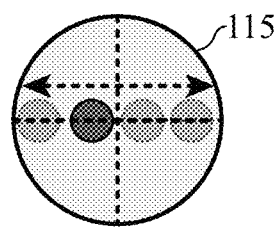
Figure 10D:
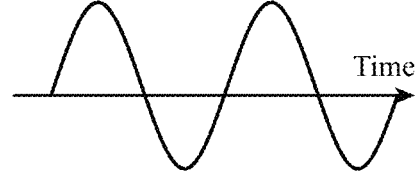

Then, when the difference between the adjacent frequencies of the first reference signals is set to be constant at the time of acquiring the received light, the peak value is swept with time as in a far field pattern illustrated in FIG. 9. FIG. 9 illustrates a temporal change in the far field pattern when the free-space optical communication apparatus uses four beams of the signal light. Here, in the acquisition of the received light in the second embodiment, as compared with the acquisition of the received light in the first embodiment, the beams of the signal light momentarily undergo coherent beam combining so that the peak intensity increases by the amount corresponding to the number of beams of the signal light. When the angle sensor 115 receives the light whose peak position has been swept with time, a received signal having a certain width as illustrated in FIG. 10B is obtained. Then, the signal processing unit 116 controls the acquisition and tracking mechanism 113 in such a manner that an average value of the center of gravity calculation of the received signal approaches the center of the angle sensor 115, so that the average value falls within the first threshold (see FIGS. 10A to 10D). The subsequent processing is similar to that of the first embodiment.

The above description has illustrated the case where the plurality of elements included in the optical phased array antenna 107 is arrayed in one dimension. However, it is not limited thereto, and the plurality of elements included in the optical phased array antenna 107 may be arrayed in two dimensions.

As described above, in the free-space optical communication apparatus according to the second embodiment, the first reference signals used in the phase control unit are synchronized with each other and have the constant difference between the adjacent frequencies. Therefore, in addition to the effects of the first embodiment, the free-space optical communication apparatus according to the second embodiment can achieve high-speed beam scanning at the rate that is more than or equal to 10 times the beam scanning rate of a conventional method in which the phase of each signal light is electronically controlled in an analog fashion.

Third Embodiment

The free-space optical communication apparatus according to the second embodiment has illustrated the case where the plurality of elements included in the optical phased array antenna 107 is arrayed in one or two dimensions. On the other hand, a free-space optical communication apparatus according to a third embodiment illustrates a case where a plurality of elements included in the optical phased array antenna 107 is arranged in a triangle, and first reference signals have frequencies that increase in a spiral fashion with respect to the plurality of elements.

An example of a configuration of the free-space optical communication apparatus according to the third embodiment is similar to the example of the configuration of the free-space optical communication apparatus according to the second embodiment illustrated in FIG. 7.

Figure 11A:
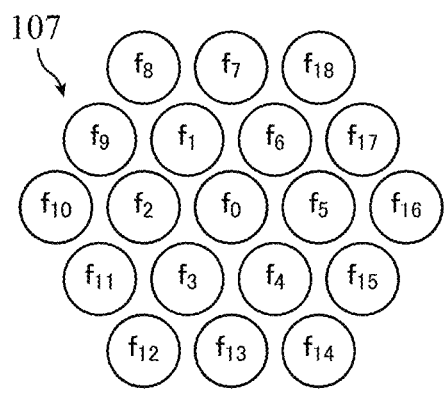
FIG. 11A is a diagram illustrating an example of the arrangement of a plurality of elements included in an optical phased array antenna in a third embodiment of the present invention.
Figure 11B:
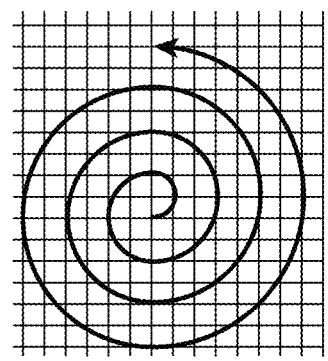
FIG. 11B is a conceptual diagram illustrating an example of a temporal change in a peak position of a far field pattern.

FIG. 11A illustrates an example of the arrangement of the plurality of elements included in the optical phased array antenna 107, and FIG. 11B illustrates, with an arrow, an example of a temporal change in the peak position in a far field pattern. Reference characters $f_0$ to $f_{18}$ in FIG. 11A indicate the frequencies of the signal light for the corresponding elements.

In the free-space optical communication apparatus according to the third embodiment, the plurality of elements included in the optical phased array antenna 107 is arrayed in a triangle as illustrated in FIG. 11A, and the frequency of each first reference signal corresponding to each element is set as expressed by the following expression (4). In expression (4), $f_i$ represents the frequency of an i-th first reference signal, and represents the frequency of an (i−1)-th first reference signal.

$$f_i = f_{i-1} + \Delta f \qquad (4)$$

As a result, the free-space optical communication apparatus according to the third embodiment scans the far field pattern in a spiral fashion at a rate of 2Δf. The free-space optical communication apparatus according to the third embodiment performs the spiral scan as described above to be able to acquire the received light without failing to scan.

Lastly, an example of a hardware configuration of the signal processing unit 116 in the first to third embodiments will be described with reference to FIG. 12. The following illustrates an example of the hardware configuration of the signal processing unit 116 in the first embodiment, but the similar applies to an example of the hardware configuration of the signal processing unit 116 in each of the second and third embodiments.

Figure 12A:
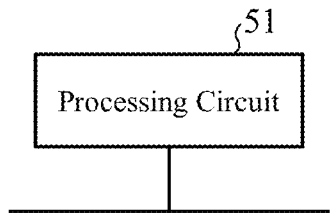
FIGS. 12A and 12B are diagrams each illustrating an example of a hardware configuration of the signal processing unit in the first to third embodiments of the present invention.
Figure 12B:
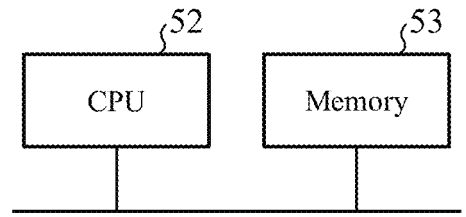

The functions of the synchronization unit 1161, the first switching unit 1162, the first determination unit 1163, the first control unit 1164, the second switching unit 1165, the second determination unit 1166, and the second control unit 1167 in the signal processing unit 116 are implemented by a processing circuit 51. The processing circuit 51 may be dedicated hardware as illustrated in FIG. 12A, or may be a central processing unit (CPU) 52 that executes a program stored in a memory 53 as illustrated in FIG. 12B, the CPU also refers to as a central processor, a processing unit, an arithmetic unit, a microprocessor, a microcomputer, a processor, or a digital signal processor (DSP).

When the processing circuit 51 is the dedicated hardware, the processing circuit 51 corresponds to, for example, a single circuit, a composite circuit, a programmed processor, a parallel-programmed processor, an application specific integrated circuit (ASIC), a field programmable gate array (FPGA), or a combination of those. The processing circuit 51 may individually or collectively implement the function of each of the synchronization unit 1161, the first switching unit 1162, the first determination unit 1163, the first control unit 1164, the second switching unit 1165, the second determination unit 1166, and the second control unit 1167.

When the processing circuit 51 is the CPU 52, the functions of the synchronization unit 1161, the first switching unit 1162, the first determination unit 1163, the first control unit 1164, the second switching unit 1165, the second determination unit 1166, and the second control unit 1167 are implemented by software, firmware, or a combination of software and firmware. The software and firmware are described as programs and stored in the memory 53. The processing circuit 51 implements the function of each unit by reading and executing the programs stored in the memory 53. That is, the signal processing unit 116 includes the memory 53 for storing the programs that, when executed by the processing circuit 51, result in the execution of each step illustrated in FIG. 4, for example. It can also be said that these programs cause a computer to execute the procedures and methods related to the synchronization unit 1161, the first switching unit 1162, the first determination unit 1163, the first control unit 1164, the second switching unit 1165, the second determination unit 1166, and the second control unit 1167. Here, the memory 53 corresponds to, for example, a non-volatile or volatile semiconductor memory such as a random access memory (RAM), a read only memory (ROM), a flash memory, an erasable programmable ROM (EPROM), or an electrically EPROM (EEPROM); a magnetic disk, a flexible disk, an optical disc, a compact disc, a mini disc, a digital versatile disc (DVD), or the like.

Note that the functions of the synchronization unit 1161, the first switching unit 1162, the first determination unit 1163, the first control unit 1164, the second switching unit 1165, the second determination unit 1166, and the second control unit 1167 may be implemented partially by dedicated hardware and partially by software or firmware. For example, the function of the synchronization unit 1161 can be implemented by the processing circuit 51 as the dedicated hardware, and the functions of the first switching unit 1162, the first determination unit 1163, the first control unit 1164, the second switching unit 1165, the second determination unit 1166, and the second control unit 1167 can be implemented by the processing circuit 51 reading and executing the programs stored in the memory 53.

As described above, the processing circuit 51 can implement each of the above functions by hardware, software, firmware, or a combination thereof.

Note that the present invention can freely combine the embodiments, modify any component in the embodiments, or omit any component in the embodiments within the scope of the invention.

INDUSTRIAL APPLICABILITY

The free-space optical communication apparatus according to the present invention can output communication light and beacon light using a single optical antenna, and is suitable for use as a free-space optical communication apparatus or the like that performs communication by outputting laser light to space.

REFERENCE SIGNS LIST

51: processing circuit, 52: CPU, 53: memory, 101: light source, 102: signal generating unit, 103: optical modulator, 104: optical splitter, 105: optical frequency shifter, 106: optical amplifier, 107: optical phased array antenna, 108: beam splitter, 109: collimator, 110: beam splitter, 111: optical phased array antenna, 112: phase control circuit, 113: acquisition and tracking mechanism, 114: wavelength separation splitter, 115: angle sensor, 116: signal processing unit, 117: signal switching circuit, 118: control circuit, 119: signal source, 120: signal splitter, 1121: signal source, 1122: signal source, 1123: RF switch, 1124: RF phase shifter, 1125: phase comparator, 1126: loop filter, 1127: VCO, 1161: synchronization unit, 1162: first switching unit, 1163: first determination unit, 1164: first control unit, 1165: second switching unit, 1166: second determination unit, 1167: second control unit

The invention claimed is:

1. A free-space optical communication apparatus comprising:
   an optical splitter to split modulated light into local oscillator light and a plurality of beams of signal light;
   a phase adjuster to adjust a phase of each of the plurality of beams of signal light obtained by the optical splitter;
   an optical amplifier to amplify each of the plurality of beams of signal light obtained after phase adjustment by the phase adjuster;
   an optical phased array antenna to output each of the plurality of beams of signal light obtained after amplification by the optical amplifier to space;
   a phase controller to synchronize each of the plurality of beams of signal light with a reference signal by controlling the phase adjuster, each of the plurality of beams of signal light being output from the optical phased array antenna and multiplexed with the local oscillator light obtained from the optical splitter;
   an acquisition and tracking mechanism to adjust an output angle of each of the plurality of beams of signal light output from the optical phased array antenna;
   an angle detector to detect an angle of arrival of received light arriving from outside the apparatus; and
   a controller to set the reference signal used in the phase controller to a plurality of first reference signals having different frequencies for the individual beams of signal light, acquire the received light by controlling the acquisition and tracking mechanism on a basis of a result of detection by the angle detector, set the reference signal to a second reference signal having an equal frequency for each of the plurality of beams of signal light after acquisition is completed, and tracking the received light by controlling the phase adjuster on a basis of the result of detection by the angle detector.

2. The free-space optical communication apparatus according to claim 1, wherein
   the first reference signals used in the phase controller have random differences between adjacent frequencies.

3. The free-space optical communication apparatus according to claim 2, wherein
   the first reference signals used in the phase controller have differences between the adjacent frequencies greater than or equal to a reception band of the angle detector.

4. The free-space optical communication apparatus according to claim 1, wherein
   the first reference signals used in the phase controller are synchronized with each other and have constant differences between adjacent frequencies.

5. The free-space optical communication apparatus according to claim 4, wherein
   the first reference signals used in the phase controller have differences between the adjacent frequencies less than or equal to a reception band of the angle detector.

6. The free-space optical communication apparatus according to claim 4, wherein
   the optical phased array antenna includes a plurality of elements arrayed in a triangle, and
   the first reference signals used in the phase controller have frequencies that increase in a spiral fashion with respect to the plurality of elements.

* * * * *